(12) United States Patent
Chen et al.

(10) Patent No.: US 11,704,326 B2
(45) Date of Patent: Jul. 18, 2023

(54) GENERALIZATION PROCESSING METHOD, APPARATUS, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Yan Chen, Beijing (CN); Kai Liu, Beijing (CN); Jing Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 17/407,272

(22) Filed: Aug. 20, 2021

(65) Prior Publication Data
US 2022/0179858 A1    Jun. 9, 2022

(30) Foreign Application Priority Data
Dec. 8, 2020    (CN) .......................... 202011445266.9

(51) Int. Cl.
*G06F 16/2458*    (2019.01)
*G06F 16/2453*    (2019.01)
(Continued)

(52) U.S. Cl.
CPC .... *G06F 16/2468* (2019.01); *G06F 16/24534* (2019.01); *G06F 40/30* (2020.01); *G06N 5/02* (2013.01)

(58) Field of Classification Search
CPC ........... G06F 16/2468; G06F 16/24534; G06F 40/30; G06N 5/02
See application file for complete search history.

(56) References Cited

U.S. PATENT DOCUMENTS 7,840,547 B1 * 11/2010 Tucker ................ G06F 16/9535
707/706
11,036,774 B2 * 6/2021 Zhao ................ G06F 16/90332
(Continued)

FOREIGN PATENT DOCUMENTS

CN    109815484 A    5/2019
CN    111198940 A    5/2020
(Continued)

OTHER PUBLICATIONS

Yang et al. "Neural Retrieval for Qeustion Answering with Cross-Attention Supervised Data Augmentation" https://arxiv.org/pdf/2009.13815.pdf Sep. 2020 (Year: 2020).*
(Continued)

*Primary Examiner* — Matthew J Ellis
(74) *Attorney, Agent, or Firm* — Brooks Kushman P.C.

(57) ABSTRACT

The present disclosure provides a generalization processing method, apparatus, device and computer storage medium, and relates to technical field of artificial intelligence and specifically to a deep learning technique. A specific implementation solution is: determining a set of candidate queries in a query library that are similar to a requested query in at least one of a literal matching manner, a semantic matching manner and a query rewriting manner; determining a generalized query corresponding to the requested query from the set of candidate queries by using a pre-trained query matching model; wherein the query matching model is obtained by pre-training based on a cross attention model. The generalization for the requested query can be achieved according to the present disclosure.

15 Claims, 8 Drawing Sheets

(51) Int. Cl.
*G06F 40/30* (2020.01)
*G06N 5/02* (2023.01)

(56) References Cited

U.S. PATENT DOCUMENTS

| | | | |
|---|---|---|---|
| 11,062,090 B2* | 7/2021 | Yang | G06F 16/90344 |
| 11,243,955 B2* | 2/2022 | Ackermann | G06F 16/3329 |
| 2014/0297266 A1* | 10/2014 | Nielson | G09B 19/06 704/9 |
| 2017/0017724 A1* | 1/2017 | MacGillivray | G06F 16/3322 |
| 2017/0308531 A1* | 10/2017 | Ma | G06F 16/2471 |
| 2019/0272296 A1* | 9/2019 | Prakash | G06F 16/90335 |
| 2020/0151347 A1* | 5/2020 | Zheng | G06N 5/02 |
| 2020/0293586 A1* | 9/2020 | Singhal | G06F 16/9574 |
| 2021/0149994 A1* | 5/2021 | Kim | G06N 3/042 |
| 2021/0286851 A1* | 9/2021 | Kota | G06N 5/04 |

FOREIGN PATENT DOCUMENTS

| | | |
|---|---|---|
| CN | 111797216 A | 10/2020 |
| CN | 111897928 A | 11/2020 |
| JP | 10143521 A | 5/1998 |

OTHER PUBLICATIONS

Hao et al. "An End-to-End Model for Question Answering over Knowledge Base with Cross-Attention Combining Global Knowledge", 2017. (Year: 2017).*
Search Report of Chinese Application No. 2020114452669 dated May 10, 2021, 2 pages.
Notice of Reasons for Refusal of Japanese patent application No. 2021-184476 dated Jan. 5, 2023, 4 pages.
Huang et al., Experimental Textbook for Information Retrieval and Utilization, pp. 148-149, Mar. 2017, 6 pages.

* cited by examiner

GENERALIZATION PROCESSING METHOD, APPARATUS, DEVICE AND COMPUTER STORAGE MEDIUM

CROSS-REFERENCE TO RELATED APPLICATIONS

The present application claims the priority of Chinese Patent Application No. 202011445266.9, filed on Dec. 8, 2020, with the title of "Generalization processing method, apparatus, device and computer storage media." The disclosure of the above application is incorporated herein by reference in its entirety.

TECHNICAL FIELD

The present disclosure relates to technical field of computer application, and particularly to a deep learning technique in the technical field of artificial intelligence.

BACKGROUND

In the era of information explosion, people desire to quickly, accurately and directly acquire information. A traditional search engine technique already cannot satisfy the user's demands. A question-answering system, as an advanced form of search engine, satisfies the user's demands for quick and precise acquisition of information in the simplest and most efficient way. Question generalization is a core technique in the question-answering system. As for a given query, all queries synonymous with the query may be returned, thereby improving the accuracy and recall rate of the response. Therefore, the generalization technique is widely applied to various service scenarios such as search, question-answering system, intelligent customer service, and advertising system.

SUMMARY

In view of the above, the present disclosure provides a generalization processing method, apparatus, device and computer storage medium.

In a first aspect, the present disclosure provides a method of generalization processing, including: determining a set of candidate queries in a query library that are similar to a requested query in at least one of a literal matching manner, a semantic matching manner and a query rewriting manner; determining a generalized query corresponding to the requested query from the set of candidate queries by using a pre-trained query matching model; wherein the query matching model is obtained by pre-training based on a cross attention model.

In a second aspect, the present disclosure provides an electronic device, including: at least one processor; and a memory communicatively connected with the at least one processor; wherein the memory stores instructions executable by the at least one processor, and the instructions are executed by the at least one processor to enable the at least one processor to perform a method of generalization processing, wherein the method includes: determining a set of candidate queries in a query library that are similar to a requested query in at least one of a literal matching manner, a semantic matching manner and a query rewriting manner; determining a generalized query corresponding to the requested query from the set of candidate queries by using a pre-trained query matching model; wherein the query matching model is obtained by pre-training based on a cross attention model.

In a third aspect, the present disclosure provides a non-transitory computer readable storage medium with computer instructions stored thereon, wherein the computer instructions are used for causing a computer to perform a method of generalization processing, wherein the method comprises: determining a set of candidate queries in a query library that are similar to a requested query in at least one of a literal matching manner, a semantic matching manner and a query rewriting manner; determining a generalized query corresponding to the requested query from the set of candidate queries by using a pre-trained query matching model; wherein the query matching model is obtained by pre-training based on a cross attention model.

As can be seen from the above technical solutions, the candidate query set is first determined in at least one of a literal matching manner, a semantic matching manner and a query rewriting manner, and then, a generalized query is further determined from the candidate query set by using the query matching model, thereby achieving generalization for the requested query.

Other effects of the above optional modes will be described below in conjunction with specific embodiments.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
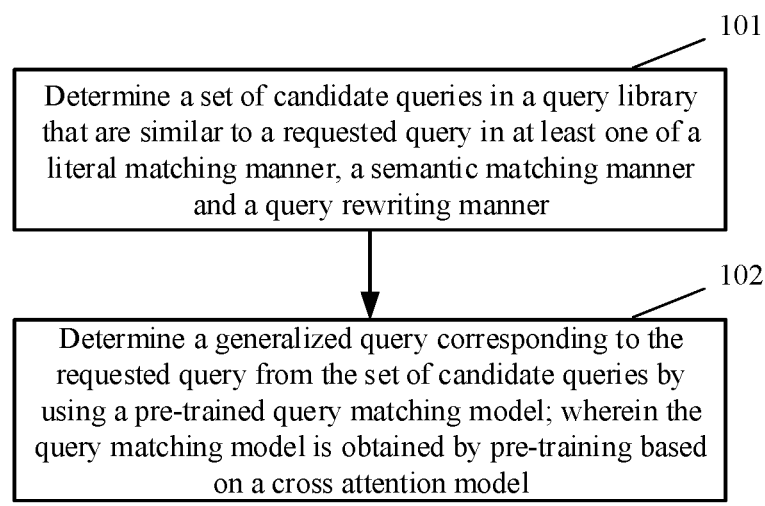
FIG. 1 illustrates a flow chart of a main method according to an embodiment of the present disclosure.

FIG. 1 illustrates a flow chart of a main method according to an embodiment of the present disclosure. The method may be executed by a server, or by a computer terminal with a strong computing capability. As shown in FIG. 1, the method may include the following steps:

In 101, a set of candidate queries in a query library that are similar to a requested query are determined in at least one of a literal matching manner, a semantic matching manner, and a query rewriting manner.

The query library involved in the embodiment of the present disclosure may have different meanings according to different specific application scenarios. For example, if the query library is applied to an ordinary search engine scenario, the query library refers to a search keyword library, i.e., the query library contains search keywords. For another example, if the query library is applied to a question-answering system scenario, the query library refers to a question library, i.e., the query library contains a library consisting of all the questions involved in the question-answering system.

In 102, a generalized query corresponding to the requested query is determined from the candidate query set by using a pre-trained query matching model; wherein the query matching model is obtained by pre-training based on a cross attention model.

It can be seen from the present embodiment that the candidate query set is first determined in at least one of a literal matching manner, a semantic matching manner, and a query rewriting manner, and then, a generalized query is further determined from the candidate query set by using the query matching model. In this way, a response to the query is made more accurate and comprehensive.

As a preferred embodiment, in the above 101, the candidate query set may be determined in the literal matching manner, the semantic matching manner and the query rewriting manner simultaneously. Detailed descriptions will be presented below in conjunction with embodiments.

Figure 2:
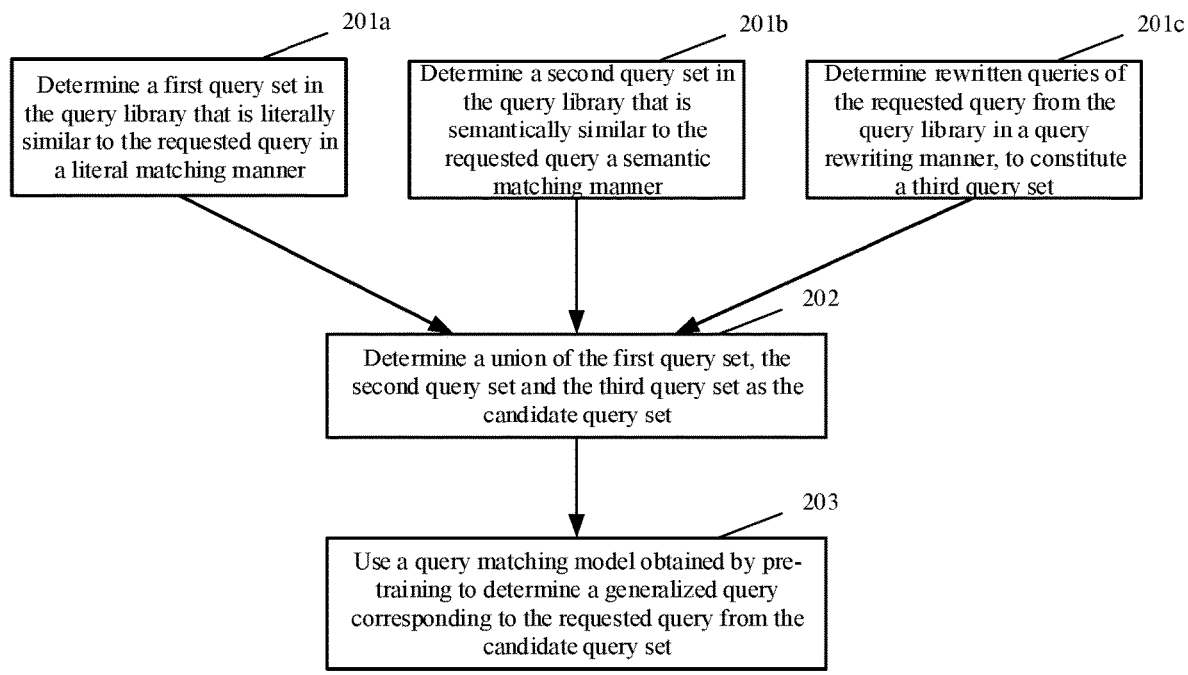
FIG. 2 illustrates a flow chart of a preferred method according to an embodiment of the present disclosure.

FIG. 2 illustrates a flow chart of a preferred method according to an embodiment of the present disclosure. As shown in FIG. 2, the method may include the following steps:

In 201*a*, a first query set in the query library that is literally similar to a requested query is determined in a literal matching manner.

The so-called literal matching means that a literal similarity between queries is greater than or equal to a preset literal similarity threshold. Usually the literal similarity may be measured by using for example Hamming distance. In this step, an already existing literal matching tool such as Elasticsearch (ES for short) or Solr may be employed to search for the requested query in the query library. The found queries are queries in the query library that are literally similar to the requested query, and form the first query set.

In 201*b*, a second query set in the query library that is semantically similar to the requested query is determined in a semantic matching manner.

Figure 3A:
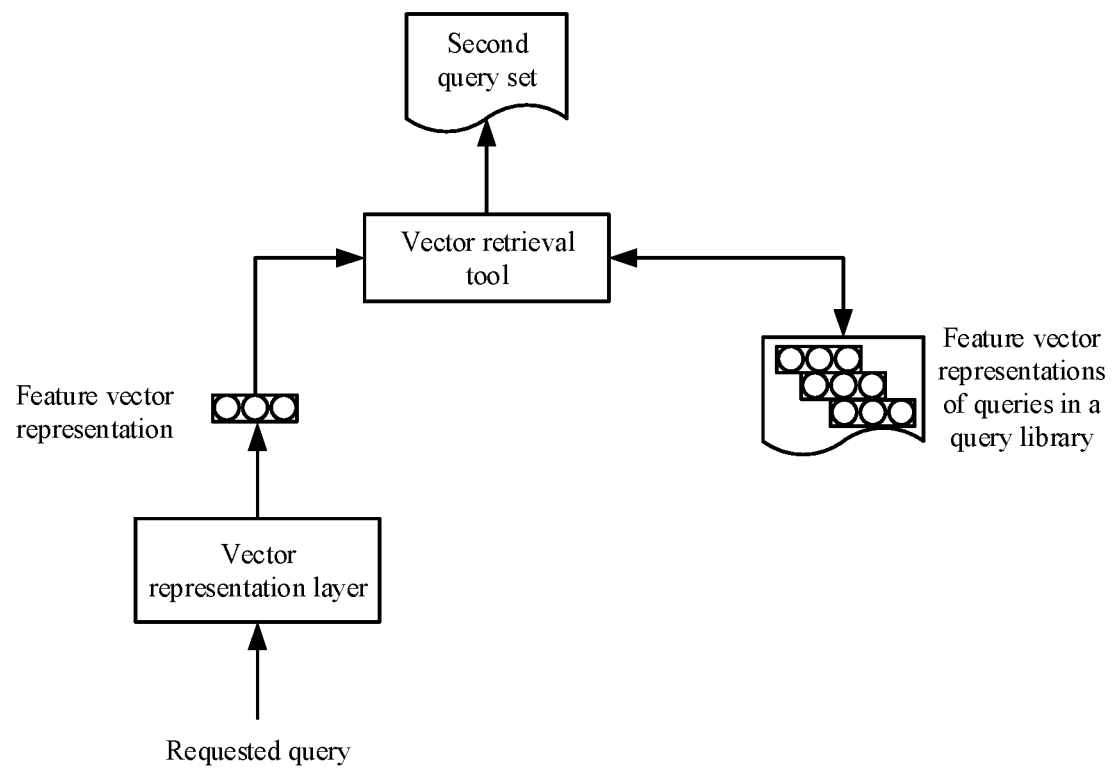
FIG. 3a illustrates a schematic diagram of semantic matching according to an embodiment of the present disclosure.

As a preferred embodiment, as shown in FIG. 3*a*, a vector representation layer in a dual model obtained by pre-training may be used in this step to determine a feature vector representation of the requested query; then, queries are searched in a vector searching manner from the query library in a way that a similarity between feature vector representations of the queries and the feature vector representation of the requested query satisfies a preset similarity requirement, to obtain the second query set. The second query set determined in this way can semantically match the requested query. The preset similarity requirement may be that the similarity exceeds a preset first similarity threshold, or may be that the similarity ranks top N, N being a preset positive integer, and so on.

As a preferred embodiment, the feature vectors of queries in the query library are obtained in advance by using the vector representation layer and correspondingly stored. In the above semantic matching process, the feature vectors of the queries in the query library may be directly obtained and used. Certainly, in addition to the preferred embodiment, it is also possible to determine the feature vectors of the queries in the query library in real time through the vector representation layer, but the efficiency is not as good as the above-mentioned preferred embodiment.

At present, there are mainly two commonly-used models in the field of information retrieval, one of which is a dual model. It is called the dual model because it uses two encoders to respectively encode the query and candidate texts to obtain the vector representation of the query and the vector representations of the candidate texts (the candidate texts in the embodiments of the present disclosure are queries in the query library), and then calculate a relevance (all referred to the similarity) between two vector representations by, for example, dot product, as a score of relevance between the query and the candidate text. Such a two-encoder structure presents a dual-tower type structure, so it is called a dual model.

The dual model involved in this step is pre-trained. A process of training the dual model may include: first obtaining first training data including a relevant query and an irrelevant query corresponding to the same query.

Then, the first training data is taken as the input of the dual model to train the dual model; a training target includes: maximizing a difference between a first similarity and a second similarity, wherein the first similarity is a similarity which is between the feature vector representation of the same query and the feature vector representation of the relevant query and is output by the vector representation layer of the dual model, and the second similarity is a similarity which is between the feature vector representation of the same query and the feature vector representation of the irrelevant query and is output by the vector representation layer of the dual model.

Figure 3B:
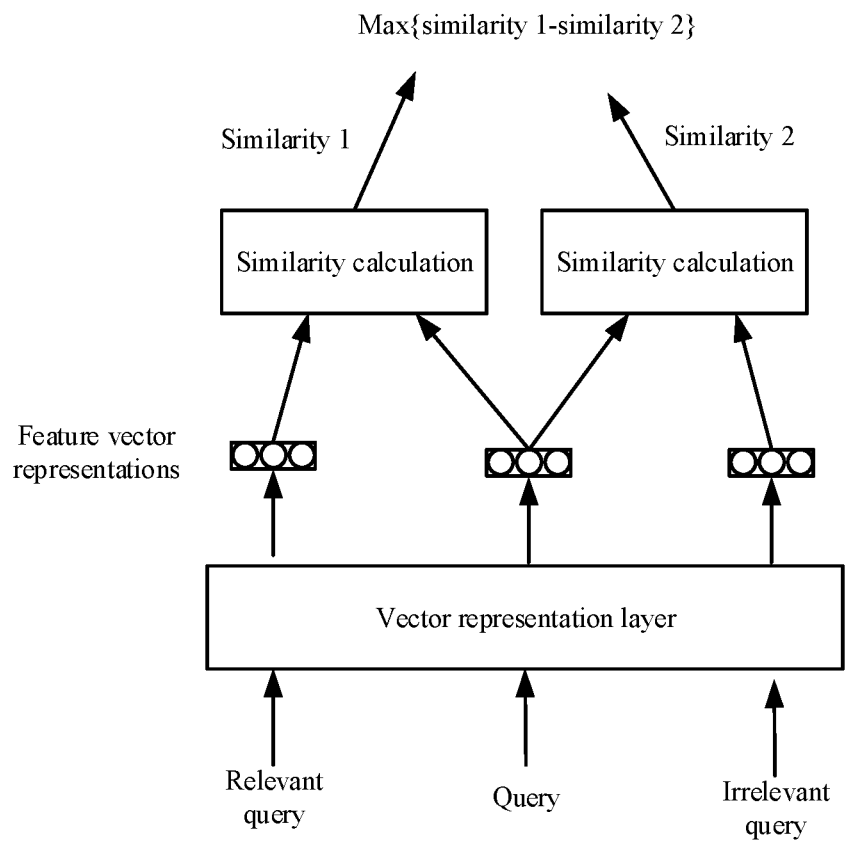
FIG. 3b illustrates a structural schematic diagram of training a dual model according to an embodiment of the present disclosure.

The structural schematic diagram of training the dual model may be shown in FIG. 3*b*. After the query, the relevant query and the irrelevant query of the query go through the vector representation layer, the feature vector representation of the query, the feature vector representation of the relevant query and the feature vector representation of the irrelevant query are obtained. The similarity between the feature vector representation of the query and the feature vector representation of the relevant query is calculated to obtain similarity 1, and the similarity between the feature vector representation of the query and the feature vector representation of the irrelevant query is calculated to obtain similarity 2. The training target is: Max{similarity 1-similarity 2}. A loss function may be constructed using the training target, and then back-propagation is performed to update the model parameters of the dual model.

In addition, when the dual model is trained, the vector representation layer may be obtained by using a pre-training language model. That is, when the dual model is trained, the vector representation layer may be obtained by further training based on a vector representation layer of a pre-training language model obtained from a large amount of unlabeled data.

After training, when the second query set in the query library that is semantically similar to the requested query in the semantic matching manner, only the vector representation layer in the dual model obtained by the above training is actually used.

In 201c, rewritten queries of the requested query are determined from the query library in the query rewriting manner, to constitute a third query set.

As a preferred implementation mode, the requested query may be input to a pre-trained query rewriting model, to obtain the rewritten queries output by the query rewriting model. The query rewriting model may be obtained by pre-training based on a Seq2Seq (sequence to sequence) model. In this way, queries with different expressions corresponding to the requested query can be obtained, and new queries and long-tail queries can also be effectively generalized.

Figure 4:
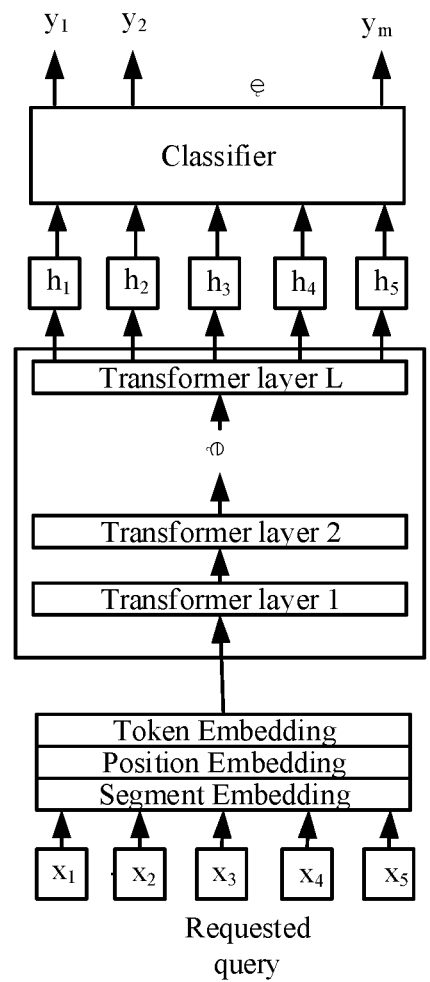
FIG. 4 illustrates a structural schematic diagram of a query rewriting model according to an embodiment of the present disclosure.

As shown in FIG. 4, the query rewriting model performs token embeddings and segment embeddings and position embeddings for the characters (represented as $x_1, x_2, \ldots, x_5$ in the figure) in the embedding layer for the input requested query. The specific content of the above embeddings performed by the embedding layer may employ a relatively mature manner in the prior art, which will not be described in detail any more here.

A hidden layer may employ a multi-layer transformer structure. The vectors obtained after embeddings are input into the hidden layer, to obtain the hidden layer vector representations of the characters (tokens), which are represented as $h_1, h_2, \ldots, h_5$ in the figure. After a layer of multi-class classifiers, characters of a rewritten query are predicted, and represented as $y_1, y_2, \ldots, y_m$, where m is a positive integer, namely, the number of the predicted characters of the rewritten query.

When the query rewriting model is pre-trained, the second training data may be obtained first, and the second training data includes the sample query and its corresponding rewritten query. Then the sample query is taken as an input of the pre-trained Seq2Seq model, and the rewritten query is taken as a target output of the Seq2Seq model to further train the Seq2Seq model.

The above training process may employ a pre-training-fine-tuning training mode. The query rewriting model is obtained by training the second training data based on a pre-training language model, i.e., a pre-trained mask language model, then obtaining the Seq2Seq model based on the mask language model, and on this basis, performing fine-tuning by using the second training data. In addition, some guidance information such as synonyms and the same rule may also be added to ensure the diversity of the rewriting result.

In addition, it should be appreciated that the above steps 201a, 201b and 201c may be three steps executed in parallel, or may be three steps executed successively in any order, which is not particularly limited here.

In 202, a union of the first query set, the second query set and the third query set is determined as the candidate query set.

The candidate query set is determined in a manner of obtaining a union of the query sets obtained in the above three manners, thereby making the generalization of the requested query more comprehensive.

In 203, a query matching model obtained by pre-training is used to determine a generalized query corresponding to the requested query from the candidate query set.

As a preferred implementation mode, queries may be taken out one by one from the candidate query set to form query pairs with the requested query. After the query pairs are concatenated and then input into the query matching model, and the query matching model outputs a classification result regarding whether the query pairs are relevant queries. Then, based on the classification result, the generalized query corresponding to the requested query is obtained by using the relevant query of the requested query.

Figure 5:
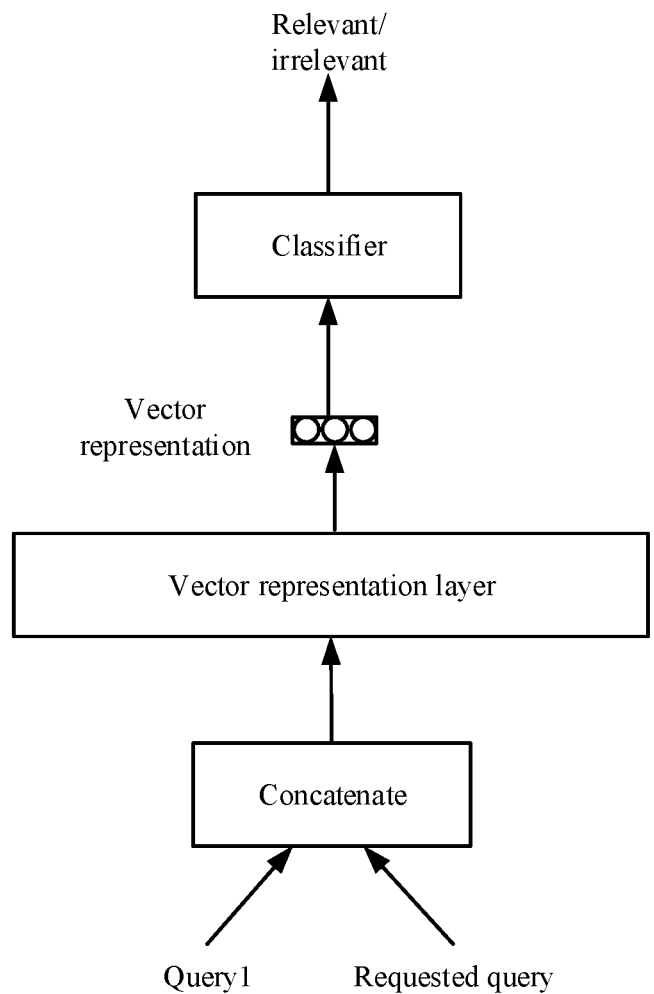
FIG. 5 illustrates a structural schematic diagram of a query matching model according to an embodiment of the present disclosure.

As mentioned above, currently there are mainly two commonly-used models in the field of information retrieval, one of which is a dual model. The model used in the semantic matching in above step 201b is the dual model. The other model is a cross attention model. The so-called cross attention model is concatenating the query and the candidate text, then uniformly encoding the text obtained from the concatenation by using a cross attention mechanism, and then mapping an encoding result to obtain a relevance between the query and the candidate text. In this step, the above query matching model may employ the cross attention model. As shown in FIG. 5, for example, query1 in the candidate query set and the requested query constitute a query pair. After the query pair is concatenated, the vector representation layer of the query matching model performs encoding and then outputs a vector representation corresponding to the query pair after the concatenation. The vector representation is classified by a classifier to obtain a probability that the query pair belongs to the relevant query, thereby obtaining a classification result regarding whether the query pair is the relevant query.

As one of the implementation modes, the relevant query of the requested query may be determined as a generalized query corresponding to the requested query according to the classification result. As another implementation mode, it is also possible to, according to a probability that the query pair belongs to the relevant query, regard the other query in the query pair whose probability value is greater than or equal to a preset probability value as the generalized query of the requested query.

As a preferred implementation mode, when the query matching model is trained, third training data may be obtained first, and the third training data may include a sample query pair, and whether the sample query pair is the relevant query or irrelevant query is labelled; then, the sample query pair is concatenated and input into the cross attention model, and a label of the sample query pair is taken as a target classification result of the sample query pair by the cross attention model. In other words, if the input sample query pair is a relevant query pair, the output target of the cross attention model is a classification result of the relevant query pair; if the input sample query pair is an irrelevant query pair, the output target of the cross attention model is a classification result of the irrelevant query pair.

The method according to the present disclosure is described in detail above. An apparatus according to the present disclosure will be described below in detail in conjunction with an embodiment.

Figure 6:
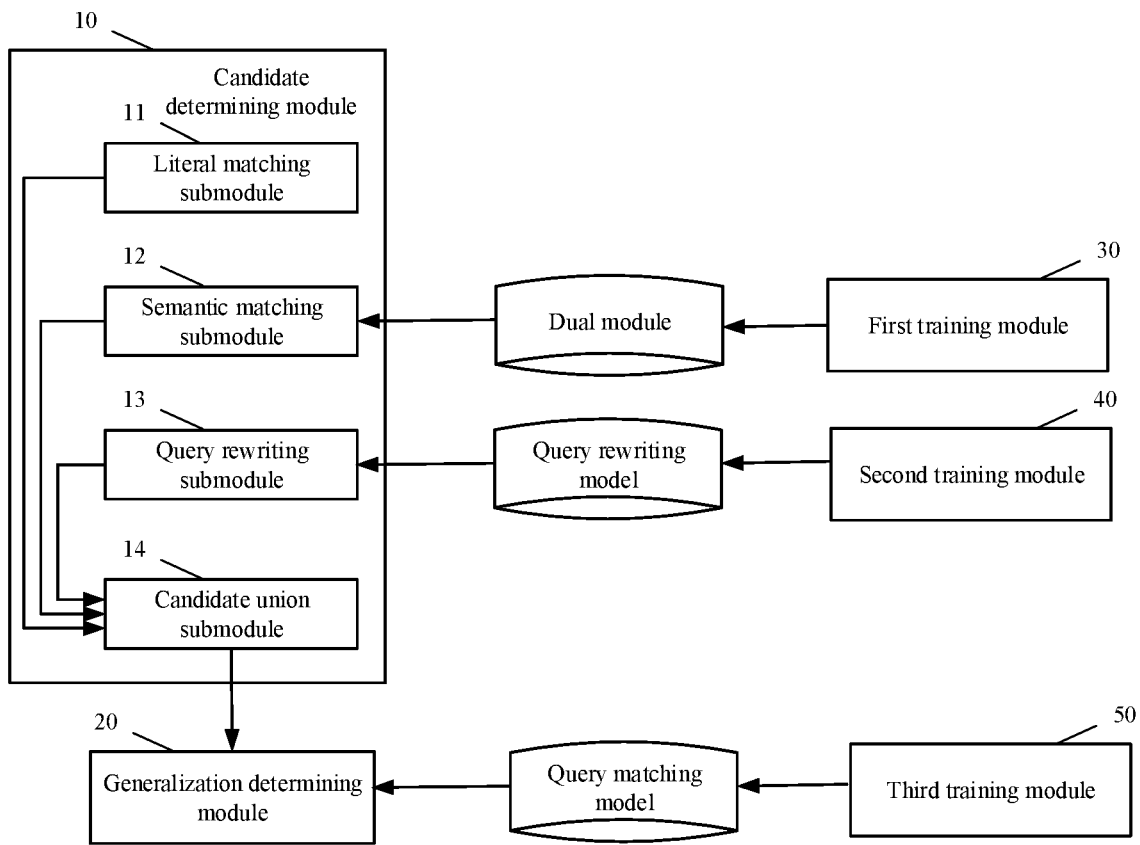
FIG. 6 illustrates a structural schematic diagram of an apparatus according to an embodiment of the present disclosure.

FIG. 6 illustrates a structural schematic diagram of an apparatus according to an embodiment of the present disclosure. The apparatus may be an application located on a server side, or it may also be a function unit such as a plug-in or a Software Development Kit (SDK) in an application in the server, or may also be located in a computer terminal with a strong computing capability. This is not particularly limited in the embodiment of the present invention. As shown in FIG. 6, the apparatus may include: a candidate determining module 10 and a generalization determining module 20, and may further include a first training module 30, a second training module 40, and a third training module 50. The main functions of the modules are as follows:

The candidate determining module 10 is configured to determine a set of candidate queries in a query library that are similar to a requested query in at least one of a literal matching manner, a semantic matching manner and a query rewriting manner.

The generalization determining module 20 is configured to determine a generalized query corresponding to the requested query from the candidate query set by using a pre-trained query matching model; wherein the query matching model is obtained by pre-training based on a cross attention model.

As a preferred implementation mode, the candidate determining module may include: a literal matching submodule 11, a semantic matching submodule 12, a query rewriting submodule 13, and a candidate union submodule 14.

The literal matching submodule 11 is configured to determine a first query set in the query library that is literally similar to the requested query in a literal matching manner.

Specifically, the literal matching submodule 11 may use an already existing literal matching tool such as Elasticsearch (ES for short) or Solrt to search for the requested query in the query library. The found queries are queries in the query library that are literally similar to the requested query, and form a first query set.

The semantic matching submodule 12 is configured to determine a second query set in the query library that is semantically similar to the requested query a semantic matching manner.

Specifically, the semantic matching submodule 12 may use a vector representation layer in a dual model obtained by pre-training to determine a feature vector representation of the requested query; search, in a vector searching manner, from the query library for queries in a way that a similarity between feature vector representations of the queries and the feature vector representation of the requested query satisfies a preset similarity requirement.

The first training module 30 is configured to train the dual model in the following manner: obtaining first training data including a relevant query and an irrelevant query corresponding to the same query; taking the first training data as input of the dual model to train the dual model; a training target includes: maximizing a difference between a first similarity and a second similarity, wherein the first similarity is a similarity which is between the feature vector representation of the same query and the feature vector representation of the relevant query and is output by the vector representation layer of the dual model, and the second similarity is a similarity which is between the feature vector representation of the same query and the feature vector representation of the irrelevant query and is output by the vector representation layer of the dual model.

The query rewriting submodule 13 is configured to determine rewritten queries of the requested query from the query library in a query rewriting manner, to constitute a third query set.

Specifically, the query rewriting submodule 13 inputs the requested query into a pre-trained query rewriting model, to obtain the rewritten queries output by the query rewriting model. The query rewriting model may be obtained by pre-training based on a Seq2Seq model.

The second training module 40 is configured to pre-train the query rewriting module in the following manner: obtaining second training data including a sample query and its corresponding rewritten query; taking the sample query as an input of the pre-trained Seq2Seq model, and taking the rewritten query as a target output of the Seq2Seq model to further train the Seq2Seq model.

The candidate union submodule 14 is configured to determine a union of the first query set, the second query set and the third query set as the candidate query set.

As a preferred implementation mode, the generalization determining module 20 may take out queries one by one from the candidate query set to form query pairs with the requested query; concatenate the query pairs and then input them into the query matching model, the query matching model outputting a classification result regarding whether the query pairs are relevant queries; obtain, based on the classification result, generalized queries corresponding to the requested query by using the relevant queries of the requested query.

The third training module 50 is configured to pre-train the query matching module in the following manner: obtaining third training data including a sample query pair, and labelling whether the sample query pair is the relevant query or irrelevant query; concatenating the sample query pair an then inputting it into the cross attention model, and taking a label of the sample query pair as a target classification result of the sample query pair by the cross attention model.

The above method and apparatus according to embodiments of the present disclosure may be applied to the following application scenarios:

Application Scenario 1:

There are many question-answer pairs in a question-answer library of the question-answering system, and each question-answer pair consists of a question and an answer. When the user inputs the requested question, the above method and apparatus according to embodiments of the present application are used to generalize the requested question to obtain more than one generalized questions. Then, the requested question and the generalized question are used to match in the question-answer library respectively to find an answer corresponding to the matched question, and return the answer to the user.

In this way, even if there is a certain difference between the expression of the requested question input by the user and questions in the question-answer library, since candidate questions are obtained from multiple dimensions such as literal dimension, semantic dimension and rewriting dimension, and the generalized questions are obtained in a question-matching manner, the returned answer is made more comprehensive and accurate.

Application Scenario 2:

In ordinary search engine service, after a user enters a search keyword, the method and apparatus according to the embodiments of the present disclosure are used to generalize the search keyword to obtain more than one generalized search keyword. Then, the search keyword entered by the user and the generalized search keyword are used for search, and a search result is returned.

In this way, in addition to returning to the user a page that matches the search keyword entered by the user, it is also possible to return to the user a page corresponding to a search keyword having a certain matching degree with the search keyword entered by the user in literal, semantic and rewriting aspects, thereby making the returned search result more comprehensive and accurate.

According to embodiments of the present disclosure, the present disclosure further provides an electronic device and a readable storage medium.

Figure 7:
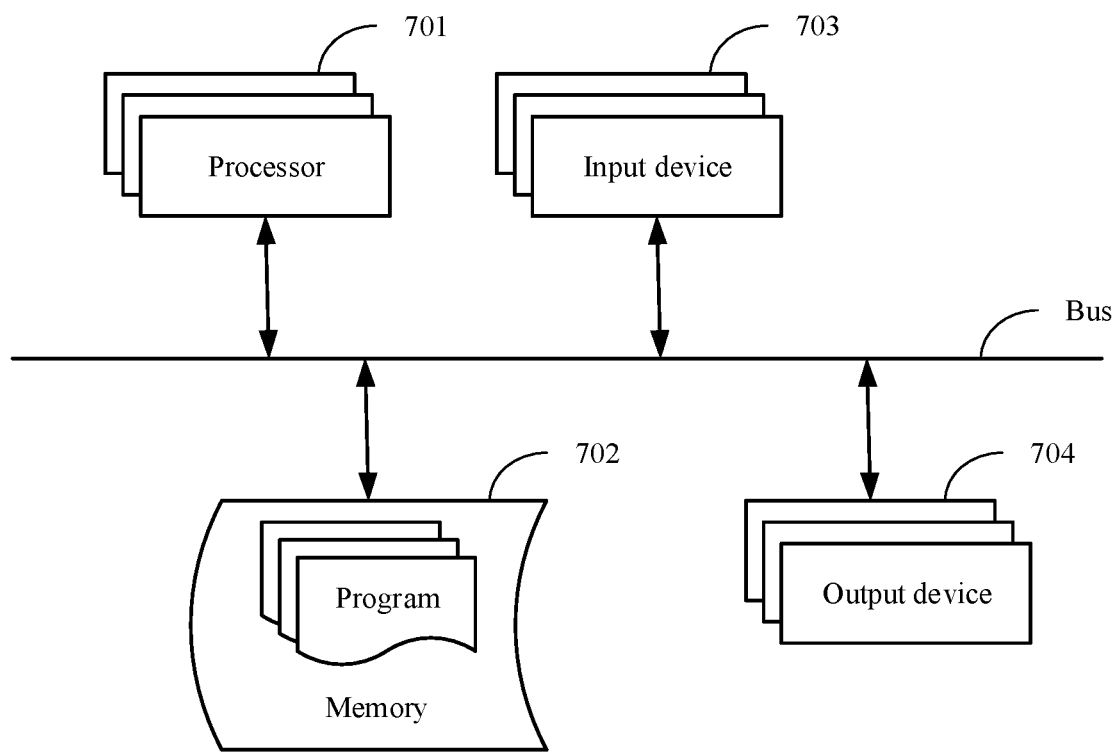
FIG. 7 illustrates a block diagram of an electronic device for implementing embodiments of the present disclosure.

As shown in FIG. 7, it shows a block diagram of an electronic device for implementing the method of generalization processing according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 7, the electronic device comprises: one or more processors 701, a memory 702, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 701 is taken as an example in FIG. 7.

The memory 702 is a non-transitory computer-readable storage medium provided by the present disclosure. The memory stores instructions executable by at least one processor, so that the at least one processor executes the method of generalization processing according to the present disclosure. The non-transitory computer-readable storage medium of the present disclosure stores computer instructions, which are used to cause a computer to execute the method of generalization processing according to the present disclosure.

The memory 702 is a non-transitory computer-readable storage medium and can be used to store non-transitory software programs, non-transitory computer executable programs and modules, such as program instructions/modules (e.g., relevant modules shown in FIG. 4 and FIG. 5) corresponding to the method of generalization processing in embodiments of the present disclosure. The processor 701 executes various functional applications and data processing of the server, i.e., implements the method of generalization processing in the above method embodiments, by running the non-transitory software programs, instructions and modules stored in the memory 702.

The memory 702 may include a storage program region and a storage data region, wherein the storage program region may store an operating system and an application program needed by at least one function; the storage data region may store data created for use in the electronic device in implementing the text error correction method. In addition, the memory 702 may include a high-speed random access memory, and may also include a non-transitory memory, such as at least one magnetic disk storage device, a flash memory device, or other non-transitory solid-state storage device. In some embodiments, the memory 702 may optionally include a memory remotely arranged relative to the processor 701, and these remote memories may be connected to the electronic device for implementing the text error correction method through a network. Examples of the above network include, but are not limited to, the Internet, an intranet, a local area network, a mobile communication network, and combinations thereof.

The electronic device for implementing the route planning method may further include an input device 703 and an output device 704. The processor 701, the memory 702, the input device 703 and the output device 704 may be connected through a bus or in other manners. In FIG. 7, the connection through the bus is taken as an example.

The input device 703 may receive inputted numeric or character information and generate key signal inputs related to user settings and function control of the electronic device for implementing the text error correction method, and may be an input device such as a touch screen, keypad, mouse, trackpad, touchpad, pointing stick, one or more mouse buttons, trackball and joystick. The output device 704 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method of generalization processing, comprising:
   determining a set of candidate queries in a query library that are similar to a requested query in at least one of a literal matching manner, a semantic matching manner and a query rewriting manner; and
   determining a generalized query corresponding to the requested query from the set of candidate queries by using a pre-trained query matching model,
   wherein the query matching model is obtained by pre-training based on a cross attention model,
   wherein the semantic matching manner comprises:
   using a vector representation layer in a dual model obtained by pre-training to determine a feature vector representation of the requested query;
   searching, in a vector searching manner, from the query library for queries in a way that a similarity between feature vector representations of the queries and the feature vector representation of the requested query satisfies a preset similarity requirement,
   wherein the dual model is obtained by pre-training in the following manner:
   obtaining first training data including a relevant query and an irrelevant query corresponding to the same query; and
   taking the first training data as input of the dual model to train the dual model; a training target includes: maximizing a difference between a first similarity and a second similarity, wherein the first similarity is a similarity which is between the feature vector representation of the same query and a feature vector representation of the relevant query and is output by a vector representation layer of the dual model, and the second similarity is a similarity which is between the feature vector representation of the same query and a feature vector representation of the irrelevant query and is output by the vector representation layer of the dual model.

2. The method according to claim 1, wherein the determining a set of candidate queries in a query library that are similar to a requested query in at least one of a literal matching manner, a semantic matching manner and a query rewriting manner comprises:
   determining a first query set in the query library that is literally similar to the requested query in a literal matching manner;
   determining a second query set in the query library that is semantically similar to the requested query a semantic matching manner;
   determining rewritten queries of the requested query from the query library in a query rewriting manner, to constitute a third query set; and
   determining a union of the first query set, the second query set and the third query set as the candidate query set.

3. The method according to claim 1, wherein the query rewriting manner comprises:
   inputting the requested query into a pre-trained query rewriting model, to obtain the rewritten queries output by the query rewriting model;
   wherein the query rewriting model is obtained by pre-training based on a sequence to sequence Seq2Seq model.

4. The method according to claim 2, wherein the query rewriting manner comprises:
   inputting the requested query into a pre-trained query rewriting model, to obtain the rewritten queries output by the query rewriting model;
   wherein the query rewriting model is obtained by pre-training based on a sequence to sequence Seq2Seq model.

5. The method according to claim 1, wherein the query rewriting module is obtained by pre-training in the following manner:
   obtaining second training data including a sample query and its corresponding rewritten query;
   taking the sample query as an input of the pre-trained Seq2Seq model, and taking the rewritten query as a target output of the Seq2Seq model to further train the Seq2Seq model.

6. The method according to claim 1, wherein the determining a generalized query corresponding to the requested query from the set of candidate queries by using a pre-trained query matching model comprises:
   taking out queries one by one from the candidate query set to form query pairs with the requested query;
   concatenating the query pairs and then inputting them into the query matching model, the query matching model outputting a classification result regarding whether the query pairs are relevant queries; and
   obtaining, based on the classification result, generalized queries corresponding to the requested query by using the relevant queries of the requested query.

7. The method according to claim 2, wherein the determining a generalized query corresponding to the requested query from the set of candidate queries by using a pre-trained query matching model comprises:
   taking out queries one by one from the candidate query set to form query pairs with the requested query;
   concatenating the query pairs and then inputting them into the query matching model, the query matching model outputting a classification result regarding whether the query pairs are relevant queries; and obtaining, based on the classification result, generalized queries corresponding to the requested query by using the relevant queries of the requested query.

8. The method according to claim 1, wherein the query matching module is obtained by pre-training in the following manner:
   obtaining third training data including a sample query pair, and labelling whether the sample query pair is a relevant query or an irrelevant query;
   concatenating the sample query pair an then inputting it into the cross attention model, and taking a label of the sample query pair as a target classification result of the sample query pair by the cross attention model.

9. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a method of generalization processing, wherein the method comprises:
   determining a set of candidate queries in a query library that are similar to a requested query in at least one of a literal matching manner, a semantic matching manner and a query rewriting manner; and
   determining a generalized query corresponding to the requested query from the set of candidate queries by using a pre-trained query matching model;
   wherein the query matching model is obtained by pre-training based on a cross attention model,
   wherein the semantic matching manner comprises:
   using a vector representation layer in a dual model obtained by pre-training to determine a feature vector representation of the requested query;
   searching, in a vector searching manner, from the query library for queries in a way that a similarity between feature vector representations of the queries and the feature vector representation of the requested query satisfies a preset similarity requirement,
   wherein the dual model is obtained by pre-training in the following manner:
   obtaining first training data including a relevant query and an irrelevant query corresponding to the same query; and
   taking the first training data as input of the dual model to train the dual model; a training target includes: maximizing a difference between a first similarity and a second similarity, wherein the first similarity is a similarity which is between the feature vector representation of the same query and a feature vector representation of the relevant query and is output by a vector representation layer of the dual model, and the second similarity is a similarity which is between the feature vector representation of the same query and a feature vector representation of the irrelevant query and is output by the vector representation layer of the dual model.

10. The electronic device according to claim 9, wherein the determining a set of candidate queries in a query library that are similar to a requested query in at least one of a literal matching manner, a semantic matching manner and a query rewriting manner comprises:
    determining a first query set in the query library that is literally similar to the requested query in a literal matching manner;
    determining a second query set in the query library that is semantically similar to the requested query a semantic matching manner;
    determining rewritten queries of the requested query from the query library in a query rewriting manner, to constitute a third query set; and
    determining a union of the first query set, the second query set and the third query set as the candidate query set.

11. The electronic device according to claim 10, wherein the query rewriting manner comprises: inputting the requested query into a pre-trained query rewriting model, to obtain the rewritten queries output by the query rewriting model; wherein the query rewriting model is obtained by pre-training based on a sequence to sequence Seq2Seq model.

12. The electronic device according to claim 9, wherein the query rewriting module is obtained by pre-training in the following manner:
    obtaining second training data including a sample query and its corresponding rewritten query;
    taking the sample query as an input of the pre-trained Seq2Seq model, and taking the rewritten query as a target output of the Seq2Seq model to further train the Seq2Seq model.

13. The electronic device according to claim 9, wherein the determining a generalized query corresponding to the requested query from the set of candidate queries by using a pre-trained query matching model comprises:
    taking out queries one by one from the candidate query set to form query pairs with the requested query;
    concatenating the query pairs and then input them into the query matching model, the query matching model outputting a classification result regarding whether the query pairs are relevant queries; and
    obtaining, based on the classification result, generalized queries corresponding to the requested query by using the relevant queries of the requested query.

14. The electronic device according to claim 9, wherein the query matching module is obtained by pre-training in the following manner::
    obtaining third training data including a sample query pair, and labelling whether the sample query pair is a relevant query or an irrelevant query;
    concatenating the sample query pair an then inputting it into the cross attention model, and taking a label of the sample query pair as a target classification result of the sample query pair by the cross attention model.

15. A non-transitory computer readable storage medium with computer instructions stored thereon, wherein the computer instructions are used for causing a computer to perform a method of generalization processing, wherein the method comprises:
    determining a set of candidate queries in a query library that are similar to a requested query in at least one of a literal matching manner, a semantic matching manner and a query rewriting manner; and
    determining a generalized query corresponding to the requested query from the set of candidate queries by using a pre-trained query matching model;
    wherein the query matching model is obtained by pre-training based on a cross attention model,
    wherein the semantic matching manner comprises:
    using a vector representation layer in a dual model obtained by pre-training to determine a feature vector representation of the requested query;

searching, in a vector searching manner, from the query library for queries in a way that a similarity between feature vector representations of the queries and the feature vector representation of the requested query satisfies a preset similarity requirement, wherein the dual model is obtained by pre-training in the following manner:

obtaining first training data including a relevant query and an irrelevant query corresponding to the same query; and taking the first training data as input of the dual model to train the dual model; a training target includes: maximizing a difference between a first similarity and a second similarity, wherein the first similarity is a similarity which is between the feature vector representation of the same query and a feature vector representation of the relevant query and is output by a vector representation layer of the dual model, and the second similarity is a similarity which is between the feature vector representation of the same query and a feature vector representation of the irrelevant query and is output by the vector representation layer of the dual model.

* * * * *